United States Patent

Ogawa et al.

(10) Patent No.: US 12,309,334 B2
(45) Date of Patent: May 20, 2025

(54) IMAGE-READING DEVICE COMPRISING A PLURALITY OF OPTICAL COMPONENTS ARRANGED ALONG THE SCANNING DIRECTION AND HOUSING COMPONENTS ARRANGED TO HAVE A FIRST CLEARANCE THEREBETWEEN, BOARD COMPONENTS ARRANGED TO HAVE A SECOND CLEARANCE THEREBETWEEN AND THE FIRST CLEARANCE AND THE SECOND CLEARANCE ARE ARRANGED TO BE STAGGERED IN THE SCANNING DIRECTION

(71) Applicant: Mitsubishi Electric Corporation, Tokyo (JP)

(72) Inventors: Mizuki Ogawa, Tokyo (JP); Daisuke Fukui, Tokyo (JP); Toru Shiraki, Tokyo (JP); Eiji Niikura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/650,243

(22) Filed: Apr. 30, 2024

(65) Prior Publication Data

US 2024/0283882 A1    Aug. 22, 2024

Related U.S. Application Data

(62) Division of application No. 17/639,589, filed as application No. PCT/JP2020/028245 on Jul. 21, 2020, now Pat. No. 12,015,750.

(30) Foreign Application Priority Data

Sep. 11, 2019 (JP) .................................. 2019-165581

(51) Int. Cl.
*H04N 1/028* (2006.01)
*H04N 1/024* (2006.01)
(Continued)

(52) U.S. Cl.
CPC ....... *H04N 1/0318* (2013.01); *H04N 1/02463* (2013.01); *H04N 2201/0446* (2013.01)

(58) Field of Classification Search
CPC ............. H04N 1/02481; H04N 1/0249; H04N 1/0318; H04N 1/193; H04N 2201/0446
(Continued)

(56) References Cited

U.S. PATENT DOCUMENTS 7,177,056 B2    2/2007  Matsumoto
2009/0046137 A1  2/2009  Morikawa et al.
(Continued)

FOREIGN PATENT DOCUMENTS

CN    103179314 A    6/2013
CN    104285430 A    1/2015
(Continued)

OTHER PUBLICATIONS

Office Action issued Jun. 28, 2024 in Chinese Patent Application No. 202080061823.9, 25 pages.
(Continued)

*Primary Examiner* — Chad Dickerson
(74) *Attorney, Agent, or Firm* — XSENSUS, LLP

(57) ABSTRACT

An image reading device includes a board including a plurality of imaging elements arranged along a scanning direction, and a housing including a plurality of optical components that are arranged along the scanning direction and a plurality of housing components that are arranged along the scanning direction. Each of the plurality of optical components focuses light reflected by a reading target onto a corresponding imaging element, and each of the plurality
(Continued)

of housing components holds at least one optical component. The plurality of housing components are arranged to have a clearance therebetween and each of the plurality of housing components is fixed to the board at a position to transmit light through the optical components to focus onto the corresponding imaging element.

6 Claims, 10 Drawing Sheets

(51) Int. Cl.
*H04N 1/031* (2006.01)
*H04N 1/00* (2006.01)

(58) Field of Classification Search
USPC .................................................. 358/400, 474
See application file for complete search history.

(56) References Cited

U.S. PATENT DOCUMENTS

| | | | |
|---|---|---|---|
| 2010/0213355 A1 | 8/2010 | Wang et al. | |
| 2013/0163057 A1* | 6/2013 | Mihara | H04N 1/1934 358/482 |
| 2014/0376061 A1* | 12/2014 | Kato | H04N 1/00798 358/474 |
| 2015/0136951 A1 | 5/2015 | Ohama et al. | |
| 2018/0249035 A1 | 8/2018 | Fujiuchi et al. | |
| 2024/0283882 A1 | 8/2024 | Ogawa et al. | |

FOREIGN PATENT DOCUMENTS

| | | | |
|---|---|---|---|
| CN | 108370402 A | | 8/2018 |
| JP | H04-094856 U | | 8/1992 |
| JP | 2005217728 A | * | 8/2005 |
| JP | 2007088881 A | * | 4/2007 |
| JP | 2007-223301 A | | 9/2007 |
| JP | 2013-219703 A | | 10/2013 |
| JP | 2016-097609 A | | 5/2016 |
| WO | 2017/104756 A1 | | 6/2017 |

OTHER PUBLICATIONS

Office Action dated Dec. 4, 2024, issued for the corresponding U.S. Appl. No. 18/650,293 (69 pages).
Office Action dated Nov. 30, 2024, issued for the corresponding CN patent application No. 202080061823.9 (31 pages; with partial English translation).
Office Action dated Mar. 11, 2025, issued for the corresponding CN patent application No. 202080061823.9 (28 pages; with partial English translation).

* cited by examiner

IMAGE-READING DEVICE COMPRISING A PLURALITY OF OPTICAL COMPONENTS ARRANGED ALONG THE SCANNING DIRECTION AND HOUSING COMPONENTS ARRANGED TO HAVE A FIRST CLEARANCE THEREBETWEEN, BOARD COMPONENTS ARRANGED TO HAVE A SECOND CLEARANCE THEREBETWEEN AND THE FIRST CLEARANCE AND THE SECOND CLEARANCE ARE ARRANGED TO BE STAGGERED IN THE SCANNING DIRECTION

CROSS-REFERENCE TO RELATED APPLICATIONS

The present application is a divisional application of U.S. application Ser. No. 17/639,589 filed Mar. 2, 2022, which is based on PCT filing PCT/JP2020/028245, filed Jul. 21, 2020, which claims priority to Japanese Application No. 2019-165581, filed Sep. 11, 2019, the entire contents of each are incorporated herein by reference.

TECHNICAL FIELD

The present disclosure relates to an image reading device.

BACKGROUND ART

An image reading device widely used in equipment such as a copier, an image scanner, and a facsimile includes (i) a line sensor that includes multiple imaging elements arranged along a scanning direction and (ii) multiple optical components arranged along the scanning direction. In the image reading device, each of the multiple optical components focuses reflected light from a reading target onto an imaging element located at a position corresponding to the optical component, and each imaging element performs photoelectric conversion of the focused reflected light. This generates image data of the reading target.

Such an image reading device is required to have high positional accuracy, especially for the optical components that form an optical path and for the imaging elements onto which light passed through the optical path is focused. In order to improve the positional accuracy, an integrated housing for holding multiple optical components is manufactured, and the multiple optical components and a board on which multiple imaging elements are mounted are assembled while ensuring the positional accuracy thereof. Example methods for ensuring accuracy in positional relationships between components such as the board and the optical components include improving component processing accuracy, improving assembly accuracy, and eliminating or reducing a change in relative positions between components due to a difference in linear expansion between the components.

Patent Literature 1 discloses an image reading device in which a component that has required assembly accuracy that is high and another component that has required assembly accuracy that is low are attached separately to separate housings. This image reading device, by employment of a tabular shape for a housing to which the component that requires a high assembly accuracy is attached, enables easy machine processing of the housing while improving the component processing accuracy and the assembly accuracy.

CITATION LIST

Patent Literature

Patent Literature 1: Unexamined Japanese Patent Application Publication No. 2013-219703

SUMMARY OF INVENTION

Technical Problem

In a case of manufacturing an integrated housing for holding multiple optical components, manufacturing a housing that holds the multiple optical components with a positional relationship that is the same as that of multiple imaging elements mounted on a board while satisfying accuracy in a positional relationship between the held optical components is required. Thus, in order to satisfy accuracy in positional relationships between the optical components and the imaging elements, the housing is to be processed with high accuracy. Further, the image reading device is to be assembled to be in a state in which no misalignment occurs between all optical components held by the housing and corresponding imaging elements. Thus, in order to satisfy accuracy in the relative positions between the optical components and the imaging elements, the housing is to be assembled with high accuracy. The image reading device disclosed in Patent Literature 1, although enabling improvement in the component processing accuracy and the assembly accuracy, cannot solve the problem that misalignment occurs in relative positions between components due to a difference in linear expansion between the components.

The present disclosure is made in view of the aforementioned circumstances, and an objective of the present disclosure is to ensure positional accuracy of an optical component and an imaging element in an image reading device.

Solution to Problem

To achieve the aforementioned objective, an image reading device according to the present disclosure includes (i) a board including a plurality of imaging elements arranged along a scanning direction and (ii) a housing including a plurality of optical components arranged along the scanning direction and a plurality of housing components arranged along the scanning direction. Each of the plurality of optical components focuses light reflected by a reading target onto a corresponding imaging element included in the plurality of imaging elements. Each of plurality of housing components holds at least one optical component included in the plurality of optical components. The plurality of housing components are arranged to have a first clearance therebetween and each of the plurality of housing components is fixed to the board at a position to transmit light through the optical component to focus onto the corresponding imaging element.

Advantageous Effects of Invention

According to the present disclosure, since the plurality of housing components are arranged to have the first clearance therebetween and each of the plurality of housing components is fixed to the board at a position to transmit light through the optical component to focus onto the corresponding imaging element, the plurality of housing components change positions thereof to track expansion and contraction of the board. This enables elimination or reduction of a change in relative positions between the plurality of optical components and the plurality of imaging elements due to a difference in linear expansion, and thus can ensure the positional accuracy of the plurality of optical components and the plurality of imaging elements.

DESCRIPTION OF EMBODIMENTS

Figure 1:
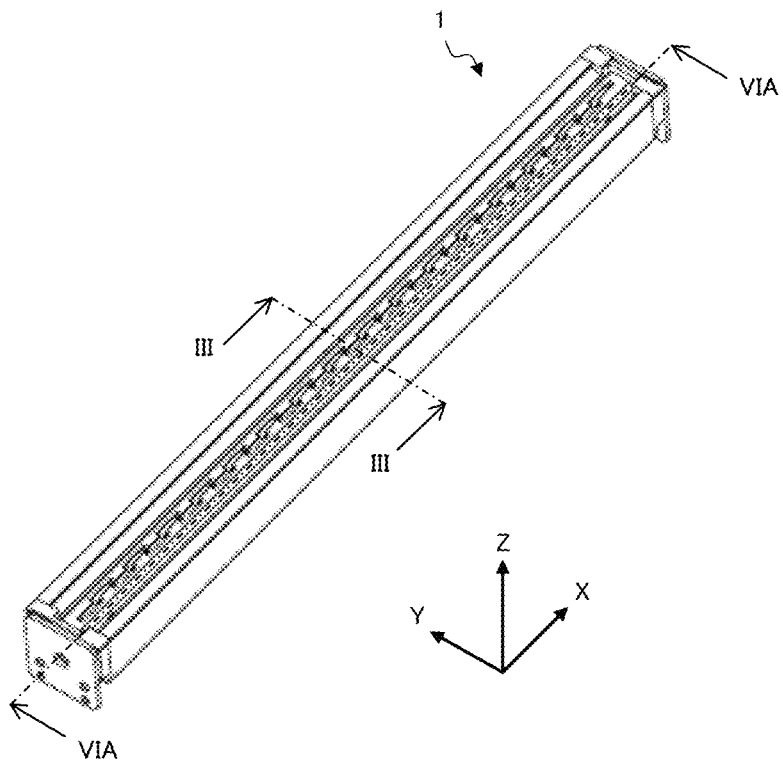
FIG. 1 is a perspective view of an image reading device according to Embodiment 1 of the present disclosure.

Hereinafter, an image reading device according to an embodiment of the present disclosure is described in detail with reference to the drawings. In the drawings, components that are the same or equivalent are assigned the same reference sign. In the orthogonal coordinate system XYZ of the drawings, X axis corresponds to a main scanning direction that is a longitudinal direction of a line sensor, Y axis corresponds to a sub-scanning direction in which the image reading device moves with respect to a reading surface, and Z axis corresponds to a vertical direction that is perpendicular to an X-Y plane. Further, when multiple components are identical, a reference sign is assigned to one representative component included in the multiple identical components in the drawings.

Embodiment 1

Figure 2:
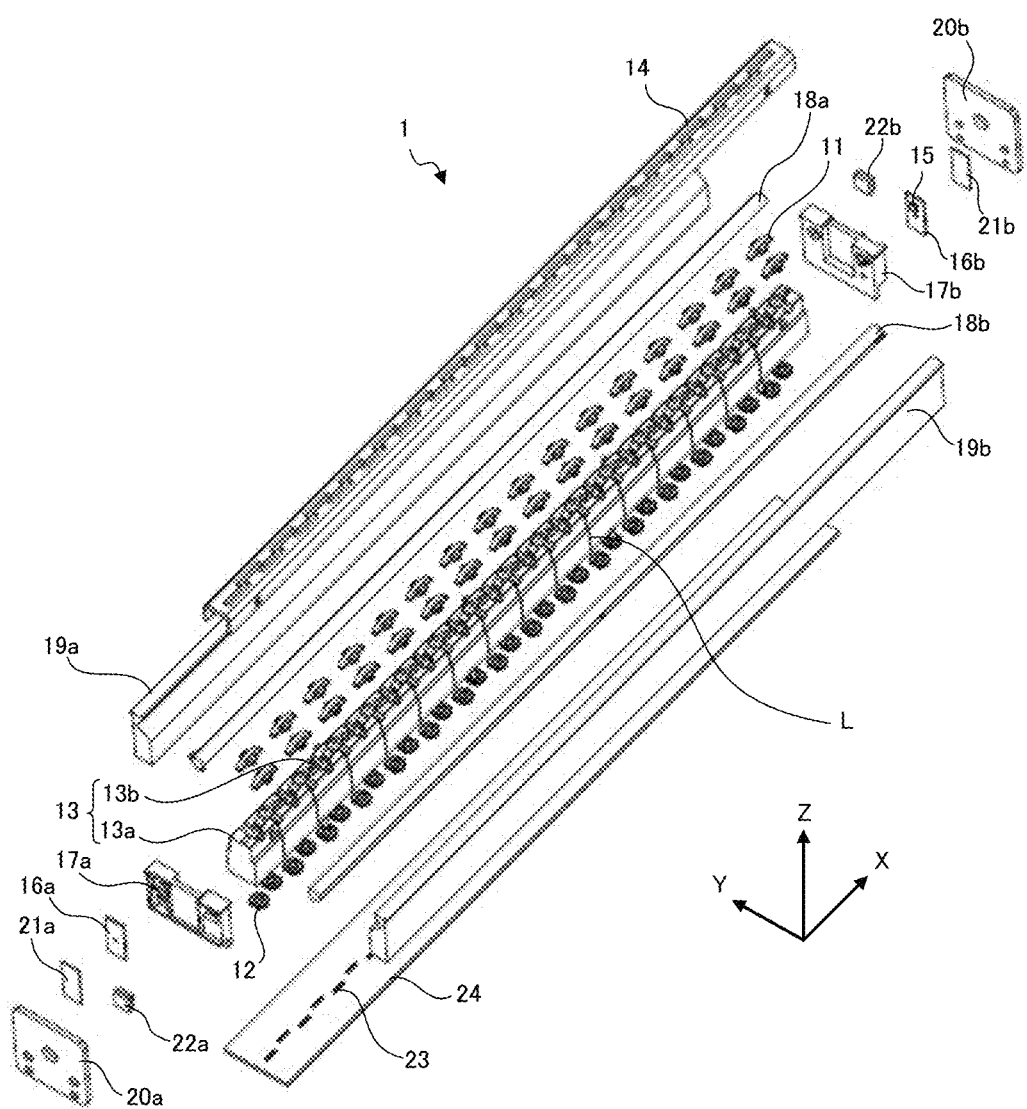
FIG. 2 is an exploded perspective view of the image reading device according to Embodiment 1.

FIG. 1 is a perspective view of an image reading device 1 according to Embodiment 1 of the present disclosure. FIG. 2 is an exploded perspective view of the image reading device 1. In FIG. 2, screws and tapes, used for fixing, shielding, and the like of components, and electronic components or the like mounted on boards 16a, 16b and 24, are not illustrated.

The image reading device 1 includes lenses 11, lenses 12 that are the same in number as the lenses 11, a housing 13 that holds the lenses 11 and the lenses 12, and a cover 14 that covers a surface of the housing 13 at which the lenses 11 are exposed. Further, the image reading device 1 includes the boards 16a and 16b on which light sources 15 are mounted, housing walls 17a and 17b that hold the boards 16a and 16b, light guides 18a and 18b that irradiate light of the light sources 15 onto the reading surface, and housing walls 19a and 19b that hold the light guides 18a and 18b. Moreover, the image reading device 1 includes brackets 20a and 20b for attachment of the image reading device 1 to a peripheral device, heat dissipation sheets 21a and 21b that dissipate heat of the boards 16a and 16b to the brackets 20a and 20b, cushions 22a and 22b that are arranged to face the light sources 15 for positioning of the light guides 18a and 18b, and the board 24 on which imaging elements 23 that are the same in number as the lenses 11 and as the lenses 12.

The lenses 11, the lenses 12, and the imaging elements 23 have a one-to-one-to-one correspondence. The lenses 11, the lenses 12, and the imaging elements 23 are each arranged along the X-axis direction in a staggered manner in two rows. That is to say, the lenses 11, the lenses 12, and the imaging elements 23 each form two rows that each are arranged at a constant pitch and are staggered relative to each other by a half pitch in the X-axis direction. Due to this configuration, the imaging elements 23 form a line sensor on the board 24.

The housing 13 is divided along the X-axis direction. That is to say, the housing 13 includes multiple components arranged along the X-axis direction. Specifically, the housing 13 includes two housing components 13a that each are arranged at a corresponding one of end portions in the X-axis direction, and multiple housing components 13b arranged between the housing components 13a.

The light sources 15 are mounted on the boards 16a and 16b and face end surfaces of the light guides 18a and 18b. The light sources 15 emit light so that the light enters the light guides 18a and 18b. The light guides 18a and 18b cause the light entered therein to propagate inside the light guides 18a and 18b, and emit the light to a reading target and onto the reading surface thereof.

Light reflected by the reading surface enters into and passes through the lenses 11 and 12. The lenses 11 and 12 focus an image on the imaging elements 23. The imaging elements 23 perform photoelectric conversion of the reflected light of the focused image, thereby generating a signal.

Figure 3:
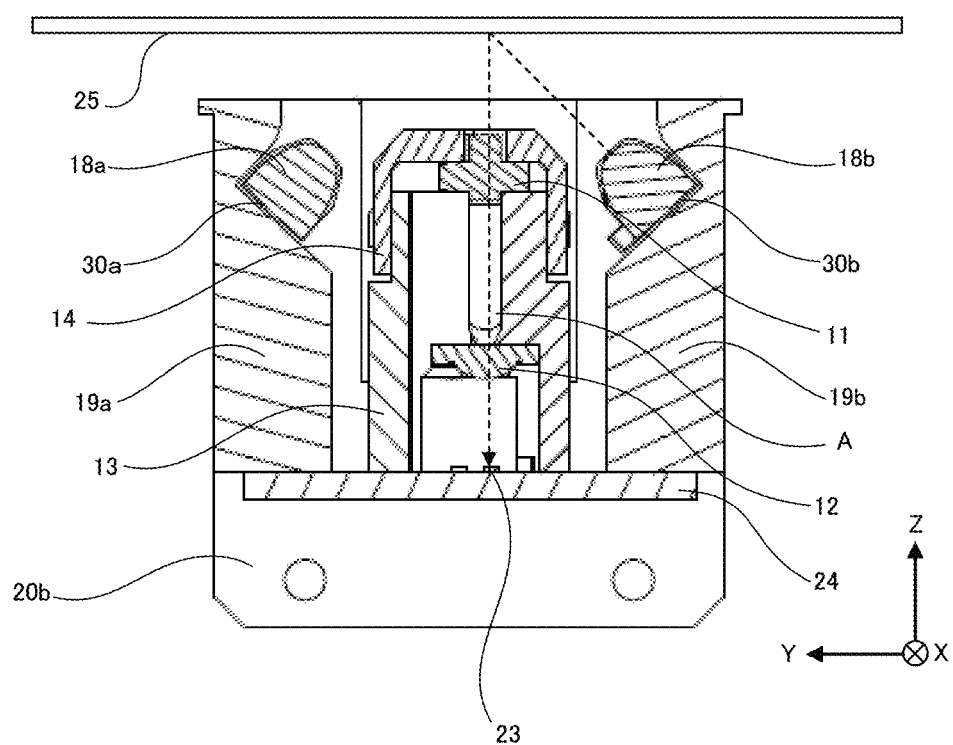
FIG. 3 is a cross-sectional view of the image reading device according to Embodiment 1, taken along a line III-III of FIG. 1.

Next, an optical path formed by the aforementioned components is described with reference to FIG. 3. A method by which the image reading device 1 generates image data of the reading target is also described. FIG. 3 is a cross-sectional view of the image reading device 1, taken along a line III-III of FIG. 1.

Upon emission of light by the light sources 15, the light enters into the light guides 18a and 18b. Since the light guides 18a and 18b have surfaces 30a and 30b on which a prism is formed, the light entering and propagated inside the light guides 18a and 18b is reflected by the surfaces 30a and 30b. The reflected light exits from the light guides 18a and 18b and is emitted to a reading target 25 and onto the reading surface thereof.

Upon irradiation of the reading surface with the light, the reading surface reflects the light. The reflected light passes through the lenses 11, apertures A, and the lenses 12, and is focused onto the imaging elements 23. Each of the apertures A is an optical component that is formed integrally with the housing component 13b and causes the light entered via each of the lenses 11 to pass through selectively and to reach the corresponding imaging element 23. A part of the light reflected by the reading surface reaches a position of each lens 11 and enters into the lens 11. Each imaging element 23 performs photoelectric conversion of the part of the reflected light that is focused, thereby generating a signal. A non-illustrated signal processing board synthesizes the signals generated by the imaging elements 23, thereby generating the image data of the reading target.

Figure 4A:
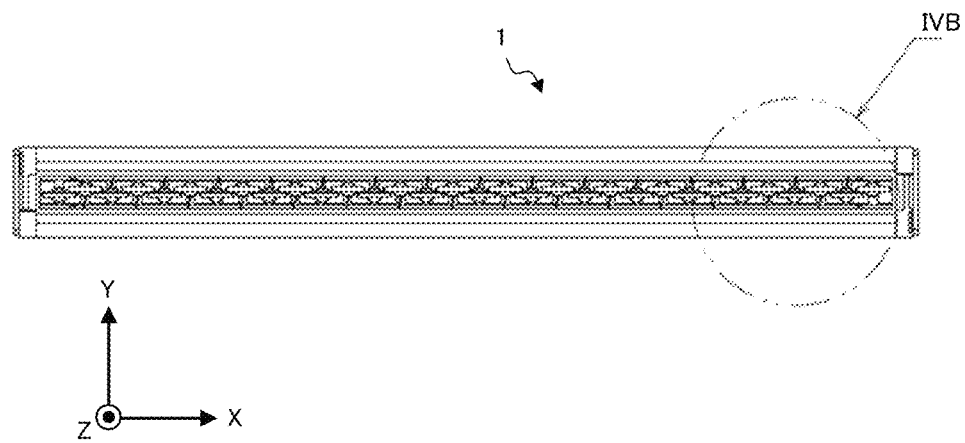
FIG. 4A is a plan view of the image reading device according to Embodiment 1 from which a cover is removed.
Figure 4B:
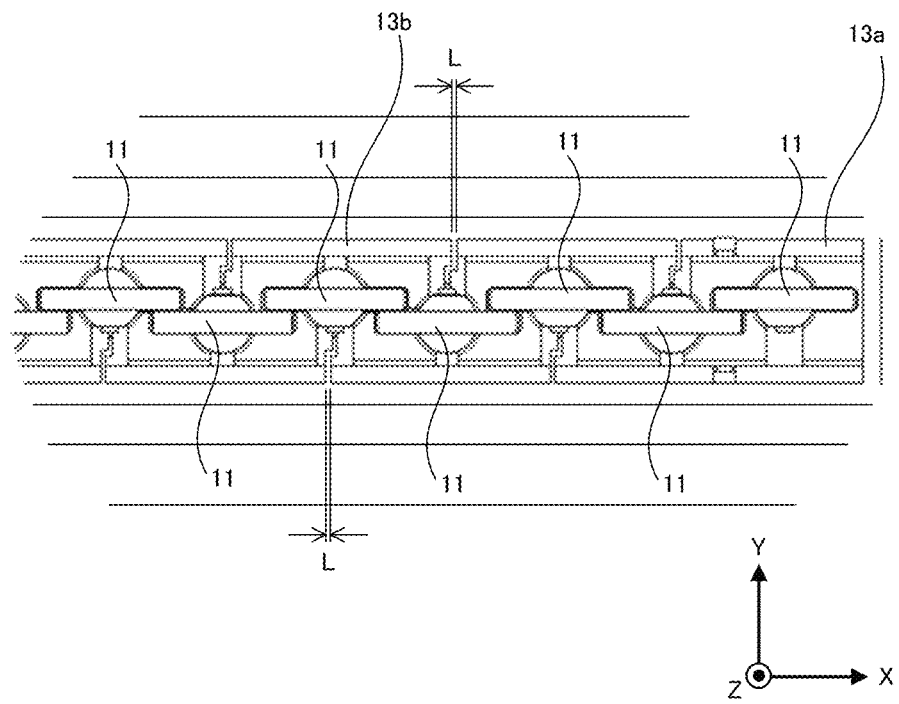
FIG. 4B is an enlarged view of an IVB part of FIG. 4A.
Figure 4C:
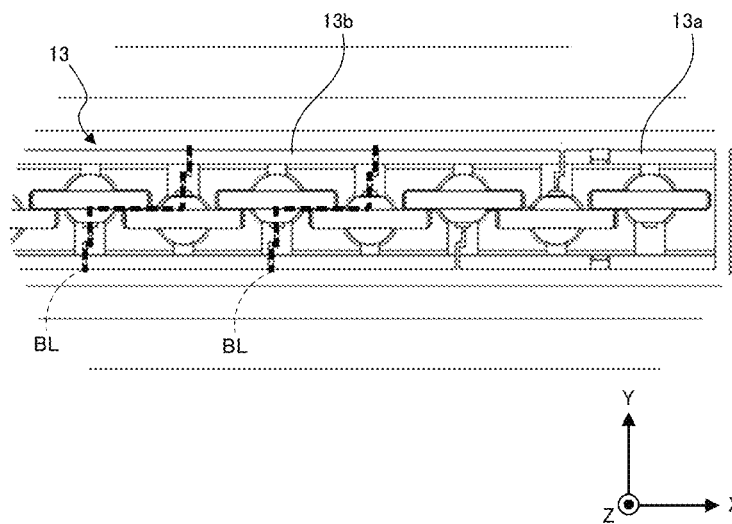
FIG. 4C illustrates dividing lines for housing components in the enlarged view of FIG. 4B.

Each of the components that form the aforementioned optical path is incorporated in the housing 13 with high positional accuracy. In order to ensure the positional accuracy of each component, the housing 13 includes the housing components 13a and 13b. Next, configuration of the housing components 13a and 13b, a shape of a portion between the housing components 13a and 13b, and a shape of a portion between the housing components 13b, are described with reference to FIGS. 4A-4C. FIG. 4A is a plan view of the image reading device 1 according to Embodiment 1 from which the cover 14 is removed. FIG. 4B is an enlarged view of an IVB part of FIG. 4A. FIG. 4C illustrates dividing lines for the housing components 13a and 13b in the enlarged view of FIG. 4B.

Each of the housing components 13a holds four of the lenses 11. Further, although not illustrated, each of the housing components 13a holds four of the lenses 12 that correspond to the lenses 11. In contrast, each of the housing components 13b holds two of the lenses 11. Further, although not illustrated, each of the housing components 13b holds two of the lenses 12 that correspond to the lenses 11. The numbers of the lenses 11 and 12 that are held by the housing components 13a and 13b are not limited to the aforementioned numbers and may be determined in accordance with a needed positional accuracy.

The housing components 13a and 13b are arranged along the X-axis direction and are arranged to have a clearance L therebetween for preventing occurrence of misalignment in relative positions due to a change in temperature.

The clearance L is bent in a crank shape with respect to the sub-scanning direction. Specifically, the clearance L is formed so as to be in a crank shape when viewed in a direction perpendicular to the main scanning direction and the sub-scanning direction, that is, when viewed in the Z-axis direction. Similarly, the clearance L bent in a crank shape with respect to the sub-scanning direction is provided between the housing components 13b. The broken lines BL illustrated in FIG. 4C indicate the dividing lines indicating portions at which the housing 13 is divided into the housing component 13a and the housing components 13b.

As illustrated in FIG. 4C, the clearance L is provided along each of the dividing lines, between the housing components 13a and 13b and between the housing components 13b. The clearance L provided as above extends from a reading-surface side of the housing 13 in a direction perpendicular to the main scanning direction and the sub-scanning direction, that is, in the Z-axis direction, and reaches the board 24 located opposite to the reading-surface side.

Figure 5:
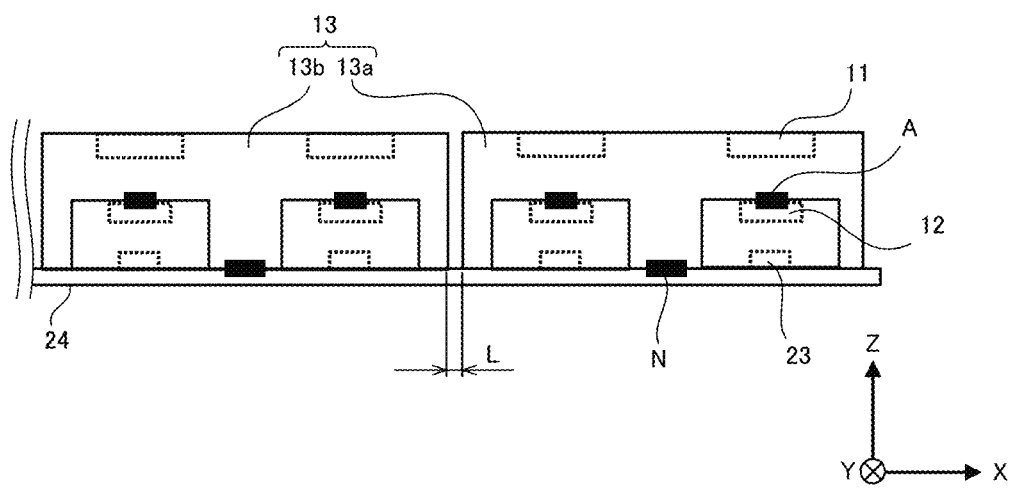
FIG. 5 is a schematic diagram illustrating relative positions of a housing and a board of the image reading device according to Embodiment 1.

Next, relative positions of the housing 13 and the board 24 are described with reference to FIG. 5. FIG. 5 is a schematic diagram illustrating the relative positions of the housing 13 and the board 24. In the example illustrated in FIG. 5, each of the housing component 13a and the housing component 13b holds two of the lenses 11 and two of the lenses 12.

The housing components 13a and 13b are arranged along the X-axis direction and are arranged to have the clearance L therebetween. That is to say, since the clearance L is provided at (i) a portion between the housing component 13a and the housing component 13b and (ii) a portion between one housing component 13b and another housing component 13b, the housing components 13a and 13b are non-contiguous at these portions in the X-axis direction.

Conversely, the board 24 is not divided into board components and is continuous in the X-axis direction. The housing components 13a and 13b are fixed to the board 24 by arrangement at positions based on positions of the imaging elements 23 and bonding to the board 24. Specifically, the housing components 13a and 13b are fixed to the board 24 in a state in which focal positions of the light passed through the lenses 11 and 12 are aligned with the positions of the imaging elements 23. In the aforementioned manner, the housing components 13a and 13b form the housing 13.

As described above, the housing 13 that is non-contiguous in the X-axis direction is fixed to the board 24 that is continuous in that direction. If both the housing 13 and the board 24 are continuous in the X-axis direction, misalignment occurs between the housing 13 and the board 24 due to a change in temperature, since the material of the housing 13 and the material of the board 24 are different in linear expansion coefficient.

The housing 13, however, is non-contiguous in the X-axis direction. Specifically, the clearance L is provided (i) between the housing component 13a and the housing component 13b and (ii) between housing components 13b. As a result, positions of the housing components 13a and 13b change to track expansion and contraction of the board 24. This configuration allows the image reading device 1 to eliminate or reduce misalignment in relative positions in the X-axis direction between the imaging elements 23 and the lenses 11 and 12 due to a difference between a linear expansion of the board 24 and a linear expansion of the housing 13.

Furthermore, eliminating or reducing misalignment in relative positions of the housing components 13a and 13b due to a difference in linear expansion relative to the board 24 enables manufacturing that satisfies only positional accuracy of the held lenses 11 and 12. In this case, the housing components 13a and 13b enable more relaxed component processing accuracy that is needed for accuracy in positional relationships between the lenses 11 and 12 and the imaging elements 23 than in a case of manufacturing an image reading device using an integrated housing.

Moreover, assembly accuracy of one component included in the housing components 13a and 13b with respect to the board 24 does not affect assembly accuracy of another component included in the housing components 13a and 13b with respect to the board 24. Thus, the housing components 13a and 13b enable more relaxed assembly accuracy that is needed for accuracy in positional relationships between the lenses 11 and 12 and the imaging elements 23 than in a case of manufacturing an image reading device using an integrated housing.

Figure 6A:
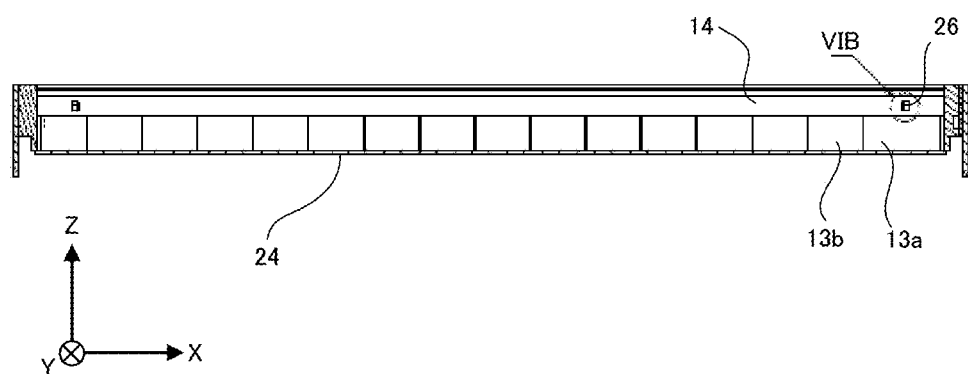
FIG. 6A is a cross-sectional view of the image reading device according to Embodiment 1, taken along a direction of a line VIA-VIA of FIG. 1.
Figure 6B:
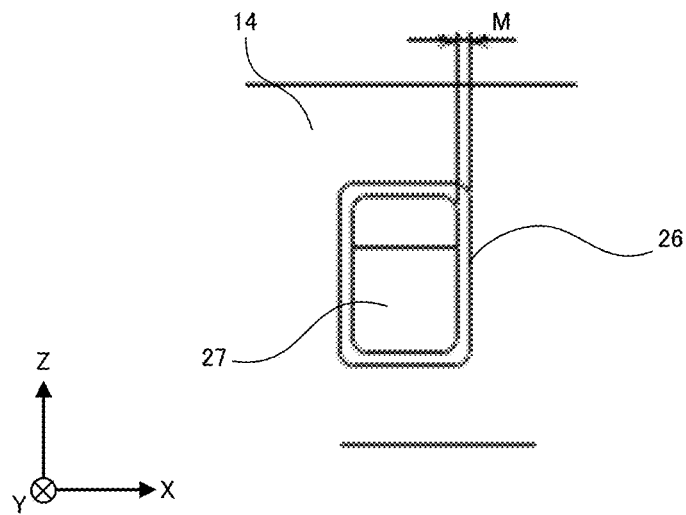
FIG. 6B is an enlarged view of a VIB part of FIG. 6A.

In the image reading device 1, the cover 14 that covers the surface of the housing 13 at which the lenses 11 are exposed also has a structure for ensuring the positional accuracy of the components. The cover 14 is described below with reference to FIGS. 6A and 6B. FIG. 6A is a cross-sectional view of the image reading device 1, taken along a direction of a line VIA-VIA of FIG. 1. FIG. 6B is an enlarged view of a VIB part of FIG. 6A.

The cover 14 has four holes 26 in total, two in the illustrated side surface and two in an opposing non-illustrated side surface. Claws 27 arranged on side surfaces of the housing components 13a are fitted into these holes 26, leading to attachment of the cover 14 to the housing 13.

A clearance M is provided between each hole 26 of the cover 14 and a corresponding claw 27 of the housing component 13a in the X-axis direction. An objective of arranging the cover 14 in the image reading device 1 is to protect the lenses 11 and to provide shielding between the lenses 11 and the light guides 18a and 18b. Thus, the cover 14 needs lower positional accuracy than other components, and satisfies needed positional accuracy even when the clearance M is provided. This is because the clearance M is arranged between each hole 26 of the cover 14 and a corresponding claw 27 of the housing component 13a. This configuration allows the cover 14 to avoid preventing the housing components 13a from change positions thereof to track expansion and contraction of the board 24.

Next, a method for manufacturing the image reading device 1 is described. First, components that are manufactured by the methods described below are prepared.

The lenses 11 and 12 and the light guides 18a and 18b are manufactured by injection molding of, for example, transparent polycarbonate that is a thermoplastic resin. The housing components 13a and 13b and the housing walls 19a and 19b are manufactured by injection molding of, for example, black polycarbonate that is a thermoplastic resin. The color of the thermoplastic resin that is the material of the housing walls 19a and 19b is not limited to black and may be any color that absorbs light at the periphery of the components. The housing walls 17a and 17b are manufactured by injection molding of, for example, white polycarbonate that is a thermoplastic resin. The color of the thermoplastic resin that is the material of the housing walls 17a and 17b is not limited to white and may be any color that reflects light at the periphery of the components.

The cover 14 and the brackets 20a and 20b are manufactured by, for example, press working of an aluminum sheet metal. The heat dissipation sheets 21a and 21b are manufactured by cutting a heat conduction sheet of acrylic resin into pieces of a predetermined size. The cushions 22a and 22b are manufactured by cutting a foamed rubber member into pieces of a predetermined size. The boards 16a and 16b are manufactured by using, for example, a laminated plate obtained by laminating copper foil onto a glass epoxy board. Electronic components, including the light sources 15, are fixed onto the laminated plate constituting the boards 16a and 16b by soldering, adhesive, or the like. The board 24 is manufactured by using, for example, a laminated plate obtained by laminating copper foil onto a glass epoxy board. Electronic components, including the imaging elements 23, are fixed onto the laminated plate constituting the board 24 by soldering, adhesive, or the like.

Then, these components are assembled to prepare the image reading device 1. Assembling of the image reading device 1 starts with positioning and bonding each of the lenses 11 and 12 to a corresponding one of the housing components 13a and 13b. Each of the housing components 13a and 13b and the lenses 11 and 12 may have a fitting portion that fits another fitting portion of a corresponding housing component or lens with each other, and positioning of the lenses 11 and 12 relative to the housing components 13a and 13b may be performed by fitting of these fitting portions. In a case in which a positioning device is used that arranges components by recognizing shapes of the components by image processing, the positioning device may perform the positioning relative to the housing components 13a and 13b by recognizing shapes of the lenses 11 and 12.

In a case of performing the positioning by image processing, positioning the lenses 11 and 12 with reference to the apertures A of the housing components 13a and 13b is preferable. This enables highly accurate positioning of the lenses 11 and 12.

Then, the housing components 13a and 13b are positioned with respect to the board 24, and the positioned housing components 13a and 13b are bonded to the board 24. Each of the housing components 13a and 13b and the board 24 may have a fitting portion, and positioning of the housing components 13a and 13b relative to the board 24 may be performed by fitting of these fitting portions. The positioning device as described above may perform the positioning of the housing components 13a and 13b relative to the board 24. In this case, performing positioning of the housing components 13a and 13b as a result of positioning the lenses 11 or the lenses 12 mounted on the housing components 13a and 13b with reference to the imaging elements 23 of the board 24 is preferable. This enables highly accurate positioning. For example, the positioning may be performed based on positions of the lenses 11 mounted on the housing components 13a and 13b and the positions of the imaging elements 23 that are recognized by capturing of an image of the housing components 13a and 13b by a camera and by execution of image processing of the captured image. The housing components 13a and 13b are positioned in the manner described above, and as illustrated in FIG. 4, are bonded to the board 24 with the provided clearances L.

Then, the cover 14 is attached to the housing 13 bonded to the board 24. At this timing, the claws 27 arranged on the side surfaces of the housing components 13a are fitted into the holes 26 in the cover 14. Then, the boards 16a and 16b, the housing walls 17a and 17b, the light guides 18a and 18b, and the housing walls 19a and 19b, are assembled, and the assembled components are attached to the board 24. Then, the brackets 20a and 20b, the heat dissipation sheets 21a and 21b, and the cushions 22a and 22b, are attached. By the aforementioned processes, manufacturing of the image reading device 1 is completed.

In the image reading device 1, as described above, the housing components 13a and 13b are made of thermoplastic resins, whereas the board 24 is made of a glass epoxy board and copper foil. Thus, the housing 13 and the board 24 have different linear expansion coefficients. This may result in, due to a change in surrounding temperature, expansion and contraction of the board 24 and occurrence of misalignment in a positional relationship with respect to the housing components 13a and 13b.

However, as illustrated in FIG. 5, the housing 13 is formed of the housing components 13a and 13b, and the housing components 13a and 13b are bonded to the board 24 while defining the clearances L therebetween in the X-axis direction. This configuration allows the housing components 13a and 13b to change positions thereof to track expansion and contraction of the board 24 due to a change in temperature of a usage environment, resulting in elimination or reduction of misalignment in relative positions of the apertures A, the lenses 11, and the lenses 12 in the X-axis direction with respect to the imaging elements 23.

The housing components 13a and 13b are each bonded to the board 24 at a corresponding one of bonding positions N that are illustrated in FIG. 5. Desirable bonding positions N for elimination or reduction of misalignment in relative positions are each located in a region including a center of a surface of a corresponding one of the housing components 13a and 13b that faces the board 24. Bonding areas of the bonding are areas capable of securing bonding strength. This configuration averages misalignments of the lenses 11 and 12 with respect to the imaging elements 23 due to a change in temperature of a usage environment.

Furthermore, a desirable clearance L for elimination or reduction of misalignment in relative positions has a width that is larger than or equal to a difference in linear expansion that the housing components 13a and 13b are to have with respect to the board 24 due to a change in temperature of the surrounding environment. This "width" is a length of the clearance L in a direction along which the housing components 13a and 13b are adjacent, and in the example illustrated in FIG. 5, corresponds to a length of the clearance L in the X-axis direction.

Specifically, the desirable clearance L has a width that is larger than or equal to a value of a difference in linear expansion due to a change in temperature of the surrounding environment with respect to the board 24 that is the largest among those of the housing components 13a and 13b. Hereinafter, the largest value of the difference in linear expansion is simply referred to as a maximum value. That is to say, the desirable clearance L is formed to have a width that prevents contact between the housing component 13a and the housing component 13b and contact between the housing components 13b even upon occurrence of any change in temperature due to a change in environment from a manufacturing environment to a usage environment. The maximum value of the difference in linear expansion that the housing components 13a and 13b have with respect to the board 24 may be obtained by, for example, measurement through prior experimentation, or may be calculated in a simulation.

A more desirable clearance L has a width that is larger than or equal to a value obtained by adding, to the maximum value of the difference in linear expansion that the housing components 13a and 13b have with respect to the board 24, (i) an error due to a variance in external dimensions of the housing components 13a and 13b, (ii) an error due to a variance in positions that occurs at the time of mounting the imaging elements 23 on the board 24, and (iii) an error due to a variance in positions that occurs at the time of assembling the housing components 13a and 13b and the board 24. This configuration enables, in the image reading device 1, relaxing (i) accuracy in external dimensions of the housing components 13a and 13b, (ii) positional accuracy at the time of mounting the imaging elements 23 on the board 24, and (iii) positional accuracy of the housing components 13a and 13b and the board 24 at the time of assembling the image reading device 1. As a result, a decrease in a manufacturing cost, improvement in productivity, and the like, are achieved for the image reading device 1.

Furthermore, in the image reading device 1, the clearance L is formed in a crank shape as illustrated in FIG. 4. This configuration eliminates or reduces leakage of light from the lenses 11 and the lenses 12 and entrance of light from the surroundings.

Moreover, in a case in which the housing 13 is integrally formed, high accuracy is required for a positional relationship between the apertures A, and additionally, various types of problems occur, such as a higher cost of a die for molding the housing 13, a longer start-up period, a longer molding time, a lower yield, and increased sophistication of the quality control method. Conversely, in the image reading device 1, the housing 13 includes multiple housing components 13a and 13b arranged along the X-axis direction. Due to this configuration, the aforementioned problems do not occur in the image reading device 1.

The number of the housing components 13b to be arranged may be increased or decreased. This enables changing a length of the housing 13 in the X-axis direction, and as a result, also enables common use of the housing component 13b of the image reading device 1 in other models that are shorter or longer in length. Thus, reduction in molding cost and die cost for the housing 13, expansion of model lineup of the image reading device 1, and the like, are achieved. Attachment of the cover 14 to the housing 13 has goals such as (i) elimination or reduction of leakage of light from the lenses 11 and 12 and entrance of light from outside the optical path, (ii) protection of the lenses 11, and the like, thus the cover 14 may by omitted in a case in which leaving these matters unsolved does not cause a problem.

Although the present embodiment describes an example of dividing the housing 13 into multiple pieces along the X-axis direction, the configuration of the housing 13 is not limited to this example. In a case of arranging each of the lenses 11, the lenses 12, and the imaging elements 23 along the X-axis direction in multiple rows, the housing 13 may be divided into multiple pieces along the Y-axis direction in correspondence to the rows. The housing components 13a and 13b have shapes obtained by dividing the housing 13 into multiple pieces along the Y-axis direction in correspondence to the rows and are arranged to have the clearance L therebetween. The housing components 13a and 13b enable eliminating or reducing a change in relative positions of the lenses 11 and 12 in the Y-axis direction with respect to the imaging elements 23. Thus, in a case of dividing the housing 13 into multiple pieces not only along the Y-axis direction but also along the X-axis direction, the housing 13 divided in this manner enables eliminating or reducing a change in positions of the lenses 11 and 12 in the X-axis direction and in the Y-axis direction with respect to the imaging elements 23.

The clearance L is an example of a first clearance in the present specification.

As described above, according to the image reading device 1 according to Embodiment 1, multiple housing components 13a and 13b that each hold the lenses 11 and 12 and are arranged along the main scanning direction are arranged to have the clearance L therebetween. Further, each of the housing components 13a and 13b is fixed to the board 24 at a position to transmit light through the lenses 11 and 12 to focus onto the corresponding imaging element 23. This configuration allows the housing components 13a and 13b to change positions thereof to track expansion and contraction of the board 24. As a result, the image reading device 1 can eliminate or reduce a change in relative positions between the lenses 11 and 12 and the imaging elements 23 due to a difference in linear expansion, and thus can ensure positional accuracy.

Furthermore, the image reading device 1 enables relaxation of component processing accuracy and assembly accuracy that are needed for achievement of accuracy in positional relationships between the lenses 11 and 12 and the imaging elements 23.

Embodiment 2

In Embodiment 1, the housing components 13a and 13b that have shapes obtained by dividing the housing 13 into multiple pieces along the X-axis direction are bonded to the board 24 that is continuous in the X-axis direction. In Embodiment 2, board components 29a and 29b that have shapes obtained by dividing a board 29 into multiple pieces along the X-axis direction are bonded to a housing 28 that is continuous in the X-axis direction.

Figure 7:
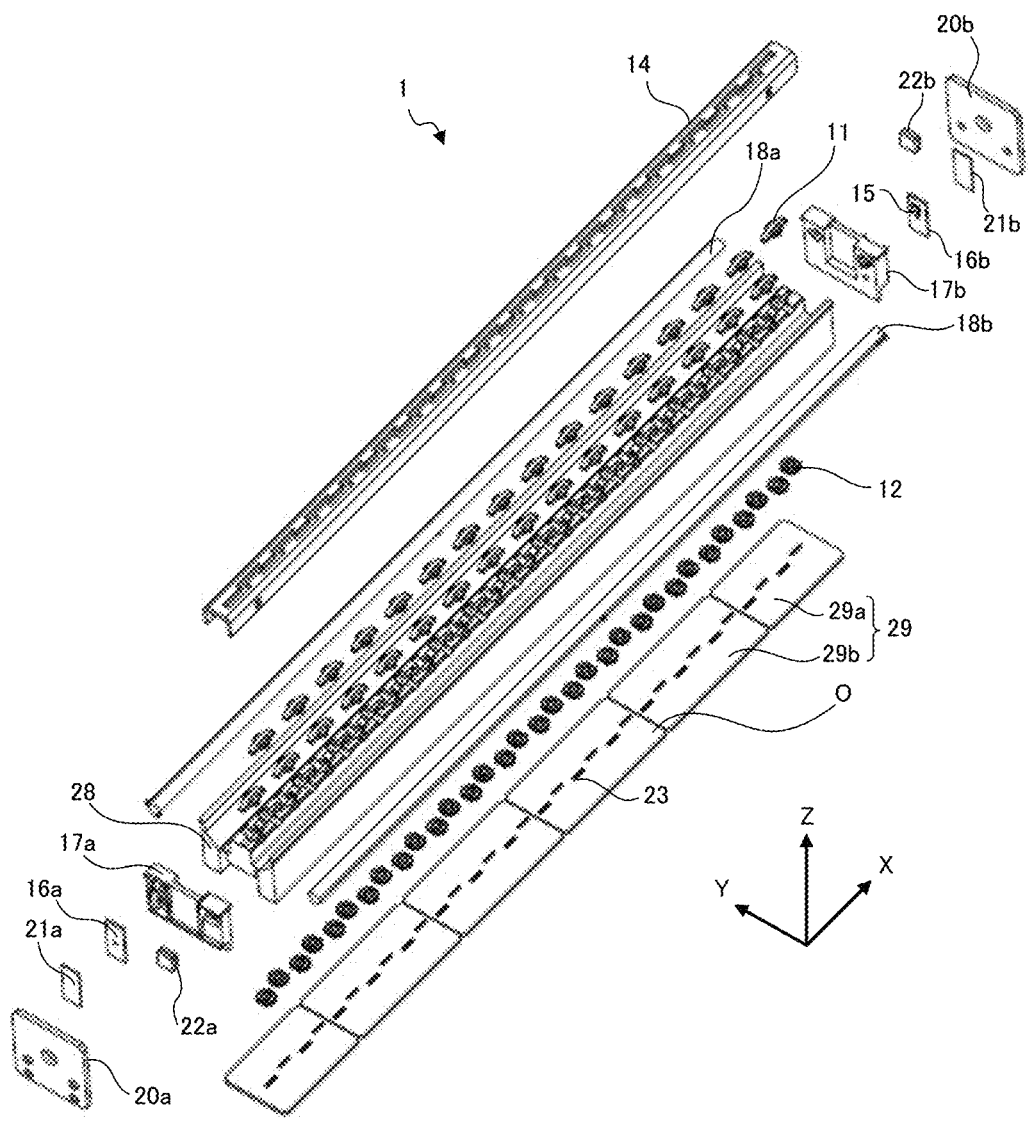
FIG. 7 is an exploded perspective view of an image reading device according to Embodiment 2 of the present disclosure.

FIG. 7 is an exploded perspective view of an image reading device 1 according to Embodiment 2 of the present disclosure. Screws and tapes, used for fixing, shielding, and the like of components, and electronic components or the like mounted on the boards 16a, 16b and 29, are not illustrated.

The image reading device 1 includes lenses 11, lenses 12 that are the same in number as the lenses 11, a housing 28 that holds the lenses 11 and the lenses 12, and a cover 14 that covers a surface of the housing 28 at which the lenses 11 are exposed. Further, the image reading device 1 includes the boards 16a and 16b on which light sources 15 are mounted, housing walls 17a and 17b that hold the boards 16a and 16b, and light guides 18a and 18b that irradiate light of the light sources 15 onto the reading surface. Moreover, the image reading device 1 includes brackets 20a and 20b for attachment of the image reading device 1 to a peripheral device, heat dissipation sheets 21a and 21b that dissipate heat of the boards 16a and 16b to the brackets 20a and 20b, cushions 22a and 22b that are arranged to face the light sources 15 for positioning of the light guides 18a and 18b, and the board 29 on which imaging elements 23 that are the same in number as the lenses 11.

The lenses 11, the lenses 12, and the imaging elements 23 have a one-to-one-to-one correspondence, similarly to Embodiment 1. The lenses 11, the lenses 12, and the imaging elements 23 are each arranged similarly to Embodiment 1, that is, arranged along the X-axis direction in a staggered manner in two rows.

Conversely, the board 29 is divided into multiple pieces along the X-axis direction. That is to say, the board 29 includes multiple components arranged along the X-axis direction. Specifically, the board 29 includes two board components 29a that each are arranged at a corresponding one of end portions in the X-axis direction, and multiple board components 29b arranged between the board components 29a. Each of the board components 29a and 29b is mounted with the imaging elements 23. The imaging elements 23 are arranged along the X-axis direction to form a line sensor on the board 29. Each of the board components 29a and 29b is connected to a non-illustrated signal processing board. Upon photoelectric conversion of reflected light by the imaging elements 23 mounted on the board components 29a and 29b, the signal processing board synthesizes signals obtained by the photoelectric conversion. The board 29 is fixed to the housing 28 in a state of alignment with the lenses 11 and 12.

The number of the imaging elements 23 that are mounted on the board components 29a and 29b may be determined in accordance with a needed relative positional accuracy with respect to the lenses 11 and 12. The configuration of the image reading device 1 other than described above is similar to that of Embodiment 1.

Figure 8:
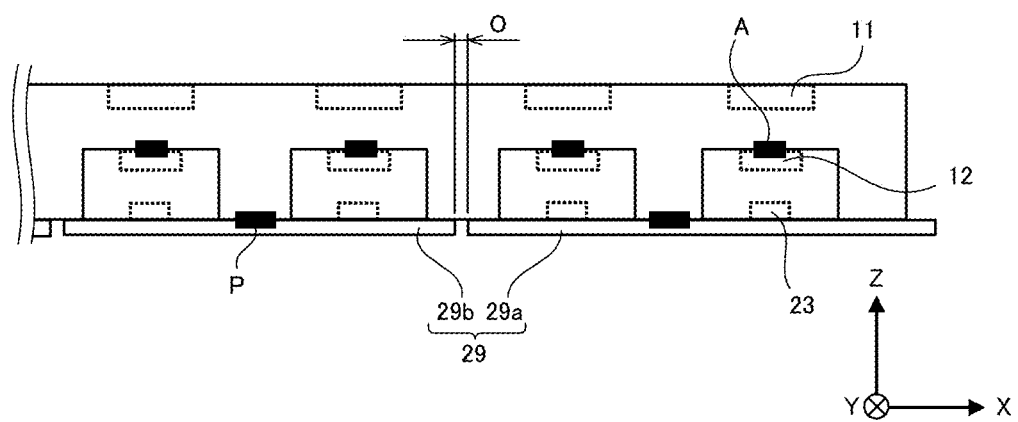
FIG. 8 is a schematic diagram illustrating relative positions of a housing and a board of the image reading device according to Embodiment 2.

Next, relative positions of the housing 28 and the board 29 are described with reference to FIG. 8. FIG. 8 is a schematic diagram illustrating the relative positions of the housing 28 and the board 29 of the image reading device 1.

The board components 29a and 29b are arranged along the X-axis direction and are arranged to have a clearance O therebetween. That is to say, since the clearance O is provided at (i) a portion between the board component 29a and the board component 29b and (ii) a portion between one board component 29b and another board component 29b, the board components 29a and 29b are non-contiguous at these portions in the X-axis direction. The board components 29a and 29b are arranged at positions based on positions of the lenses 11 and 12 and are bonded to the housing 28 that is continuous in the X-axis direction. In the aforementioned manner, the board components 29a and 29b are fixed to the housing 28. Specifically, the board components 29a and 29b are fixed to the housing 28 in a state in which focal positions of the light passed through the lenses 11 and 12 are aligned with the positions of the imaging elements 23. In the aforementioned manner, the board components 29a and 29b form the board 29.

In the image reading device 1, the clearance O is provided (i) between the board component 29a and the board component 29b and (ii) between the board components 29b. As a result, positions of the board components 29a and 29b change to track expansion and contraction of the housing 28 due to a change in temperature of a usage environment. This configuration allows the image reading device 1 to eliminate or reduce misalignment in relative positions in the X-axis direction between the imaging elements 23 and the lenses 11 and 12 due to a difference between a linear expansion of the housing 28 and a linear expansion of the board 29.

Furthermore, eliminating or reducing misalignment in relative positions due to a difference in linear expansion relative to the housing 28 enables manufacturing the board components 29a and 29b that satisfies only positional accuracy of the held imaging elements 23. In this case, the board components 29a and 29b enable more relaxed component processing accuracy that is needed for accuracy in positional relationships between the lenses 11 and 12 and the imaging elements 23 than in a case of manufacturing an image reading device using an integrated board.

Moreover, assembly accuracy of one component included in the board components 29a and 29b with respect to the housing 28 does not affect assembly accuracy of another component included in the board components 29a and 29b with respect to the housing 28. Thus, the board components 29a and 29b enable more relaxed assembly accuracy that is needed for accuracy in positional relationships between the lenses 11 and 12 and the imaging elements 23 than in a case of manufacturing an image reading device using an integrated board.

The board components 29a and 29b are each bonded to the housing 28 at a corresponding one of bonding positions P. Desirable bonding positions P for elimination or reduction of misalignment in relative positions are each located in a region including a center of a surface of a corresponding one of the board components 29a and 29b that faces the housing 28. Bonding areas of the bonding are areas capable of securing bonding strength. This configuration averages misalignments of the lenses 11 and 12 with respect to the imaging elements 23 due to a change in temperature of the usage environment.

Furthermore, a desirable clearance O for elimination or reduction of misalignment in relative positions has a width that is larger than or equal to a difference in linear expansion that the board components 29a and 29b are to have with respect to the housing 28 due to a change in temperature of the surrounding environment. This "width" is a length of the clearance O in a direction along which the board components 29a and 29b are adjacent, and in the example illustrated in FIG. 8, corresponds to a length of the clearance O in the X-axis direction.

Specifically, the desirable clearance O has a width that is larger than or equal to a maximum value of a difference in linear expansion due to a change in temperature of surrounding environment with respect to the housing 28 that is the largest among those of the board components 29a and 29b.

That is to say, the desirable clearance O is formed to have a width that prevents contact between the board component 29a and the board component 29b and contact between the board components 29b even upon occurrence of a change in temperature due to a change in environment from a manufacturing environment to a usage environment. The maximum value of the difference in linear expansion that the board components 29a and 29b have with respect to the housing 28 may be obtained by, for example, measurement through prior experimentation or may be calculated in a simulation.

A more desirable clearance O has a width that is larger than or equal to a width obtained by adding, to the maximum value of the difference in linear expansion that the board components 29a and 29b have with respect to the housing 28, (i) an error due to a variance in external dimensions of the board components 29a and 29b, (ii) an error due to a variance in positions that occurs at the time of mounting the imaging elements 23 on the board 29, and (iii) an error due to a variance in positions that occurs at the time of assembling the board components 29a and 29b and the housing 28. This configuration enables, in the image reading device 1, relaxing (i) accuracy in external dimensions of the board components 29a and 29b, (ii) positional accuracy at the time of mounting the imaging elements 23 on the board 29, and (iii) positional accuracy of the housing 28 and the board components 29a and 29b at the time of assembling the image reading device 1. As a result, a decrease in a manufacturing cost, improvement in productivity, and the like, are achieved for the image reading device 1.

The number of the board components 29b to be arranged may be increased or decreased. This enables changing a length of the board 29 in the X-axis direction, and as a result, also enables common use of the board component 29b of the image reading device 1 in other models that are shorter or longer in length. Thus, reduction in a manufacturing cost and expansion of model lineup, and the like, are achieved for the image reading device 1.

Although the present embodiment describes an example of dividing the board 29 into multiple pieces along the X-axis direction, the configuration of the board 29 is not limited to this example. In a case of arranging each of the lenses 11, the lenses 12, and the imaging elements 23 along the X-axis direction in multiple rows, the board 29 may be divided into multiple pieces along the Y-axis direction in correspondence to the rows. The board components 29a and 29b have shapes obtained by dividing the board 29 into multiple pieces along the Y-axis direction in correspondence to the rows and are arranged to have the clearance O therebetween. The board components 29a and 29b enable eliminating or reducing a change in positions of the lenses 11 and 12 in the Y-axis direction with respect to the imaging elements 23. Thus, in a case of dividing the board 29 into multiple pieces not only along the Y-axis direction but also along the X-axis direction, the board 29 divided in this manner enables eliminating or reducing a change in relative positions of the lenses 11 and 12 in the X-axis direction and in the Y-axis direction with respect to the imaging elements 23.

The clearance O is an example of a second clearance in the present specification.

As described above, according to the image reading device 1 according to Embodiment 2, multiple board components 29a and 29b that each are mounted thereon the imaging elements 23 and are arranged along the main scanning direction are arranged to have the clearance O therebetween. Further, each of the board components 29a and 29b is fixed to the housing 28 at a position to transmit light through the lenses 11 and 12 to focus onto the corresponding imaging element 23. This configuration allows the board components 29a and 29b to change positions thereof to track expansion and contraction of the housing 28. As a result, the image reading device 1 can eliminate or reduce a change in relative positions between the lenses 11 and 12 and the imaging elements 23 due to a difference in linear expansion, and thus can ensure positional accuracy.

Furthermore, similarly to Embodiment 1, the image reading device 1 enables relaxation of component processing accuracy and assembly accuracy that are needed for achievement of accuracy in positional relationships between the lenses 11 and 12 and the imaging elements 23.

Embodiment 3

An image reading device 1 according to Embodiment 3 is a device obtained by combining Embodiment 1 and Embodiment 2. That is to say, the image reading device 1 according to Embodiment 3 includes the housing 13 including housing components 13a and 13b and the board 29 including board components 29a and 29b. The housing components 13a and 13b and the board components 29a and 29b are mutually bonded and fixed to each other.

Figure 9:
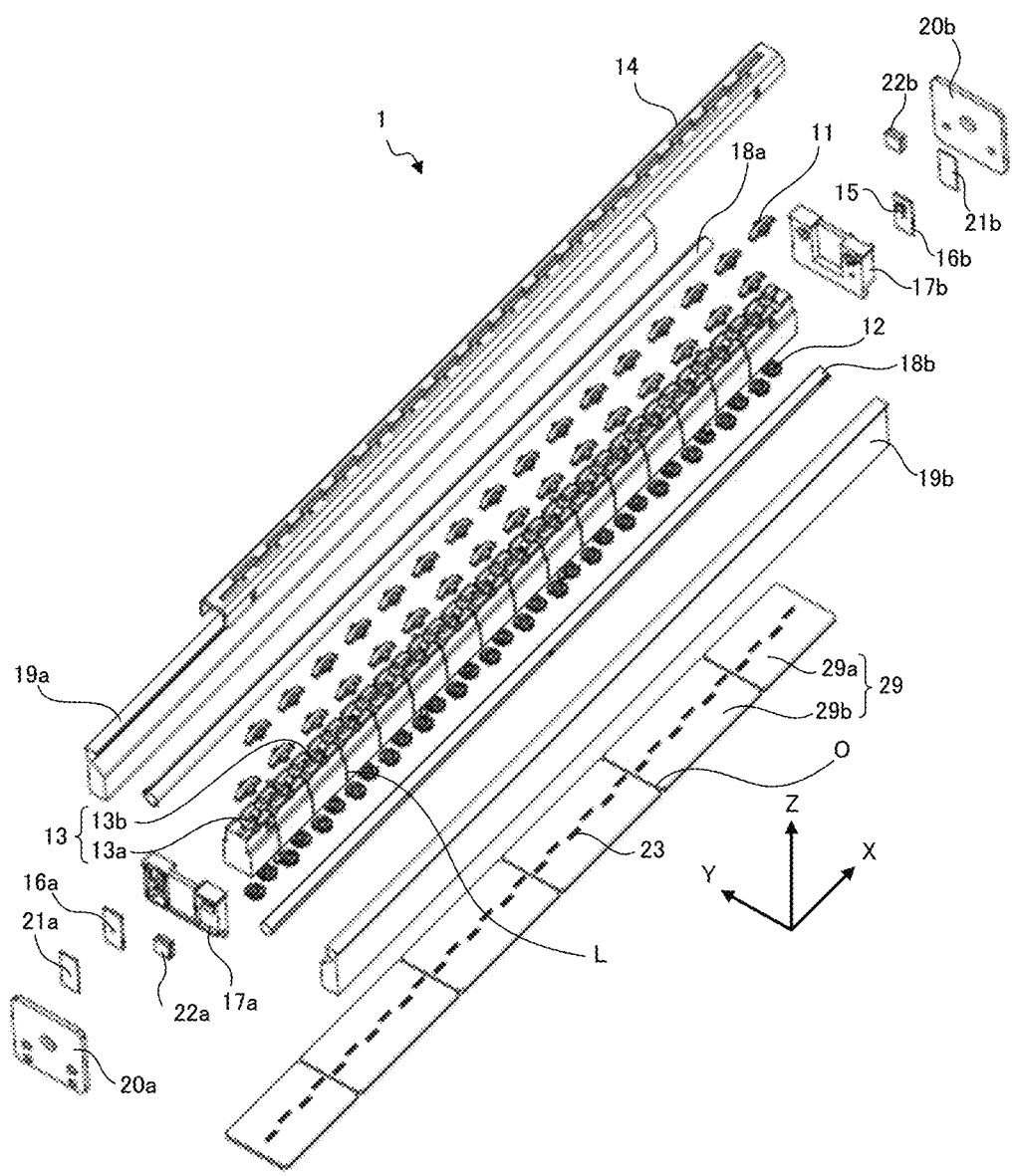
FIG. 9 is an exploded perspective view of an image reading device according to Embodiment 3 of the present disclosure.

FIG. 9 is an exploded perspective view of an image reading device 1 according to Embodiment 3 of the present disclosure. Screws and tapes, used for fixing, shielding, and the like of components, and electronic components or the like mounted on the boards 16a, 16b and 29, are not illustrated.

The image reading device 1 includes lenses 11, lenses 12 that are the same in number as the lenses 11, the housing 13 that holds the lenses 11 and the lenses 12, and a cover 14 that covers a surface of the housing 13 at which the lenses 11 are exposed. Further, the image reading device 1 includes the boards 16a and 16b on which light sources 15 are mounted, housing walls 17a and 17b that hold the boards 16a and 16b, light guides 18a and 18b that irradiate light of the light sources 15 onto the reading surface, and housing walls 19a and 19b that hold the light guides 18a and 18b. Moreover, the image reading device 1 includes brackets 20a and 20b for attachment of the image reading device 1 to a peripheral device, heat dissipation sheets 21a and 21b that dissipate heat of the boards 16a and 16b to the brackets 20a and 20b, cushions 22a and 22b that are arranged to face the light sources 15 for positioning of the light guides 18a and 18b, and the board 29 on which imaging elements 23 that are the same in number as the lenses 11.

The lenses 11, the lenses 12, and the imaging elements 23 have a one-to-one-to-one correspondence, similarly to Embodiments 1 and 2. The lenses 11, the lenses 12, and the imaging elements 23 are each arranged similarly to Embodiments 1 and 2, that is, arranged along the X-axis direction in a staggered manner in two rows.

The housing 13 includes multiple components arranged along the X-axis direction. similarly to Embodiment 1. Specifically, the housing 13 includes two housing components 13a that each are arranged at a corresponding one of end portions in the X-axis direction, and multiple housing components 13b arranged between the housing components 13a.

The board 29 includes multiple components arranged along the X-axis direction, similarly to Embodiment 2. Specifically, the board 29 includes two board components 29a that each are arranged at a corresponding one of end portions in the X-axis direction, and multiple board components 29*b* arranged between the board components 29*a*. The imaging elements 23 are mounted on the board components 29*a* and 29*b* and are arranged along the X-axis direction to form a line sensor on the board 29. Each of the board components 29*a* and 29*b* is connected to a non-illustrated signal processing board that synthesizes signals obtained by photoelectric conversion of reflected light by the imaging elements 23. The configuration of the image reading device 1 other than described above are similar to that of Embodiments 1 and 2.

Figure 10:
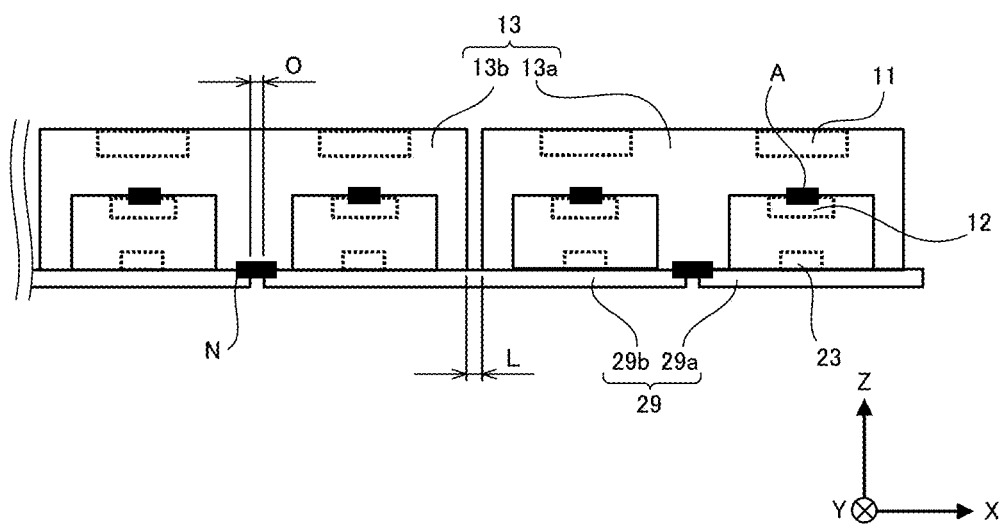
FIG. 10 is a schematic diagram illustrating relative positions of a housing and a board of the image reading device according to Embodiment 3.

The housing 13 and the board 29 that have the aforementioned configuration are fixed to each other in a state of alignment with the lenses 11 and 12. Next, relative positions of the housing 13 and the board 29 are described with reference to FIG. 10. FIG. 10 is a schematic diagram illustrating the relative positions of the housing 13 and the board 29 of the image reading device 1. In the example illustrated in FIG. 10, each of the housing component 13*a* and the housing component 13*b* holds two of the lenses 11 and two of the lenses 12.

The housing components 13*a* and 13*b* are arranged along the X-axis direction and are arranged to have the clearance L therebetween. Similarly, the board components 29*a* and 29*b* are arranged along the X-axis direction and are arranged to the clearance O therebetween. That is to say, the housing components 13*a* and 13*b* are non-contiguous in the X-axis direction (i) between the housing component 13*a* and the housing component 13*b* and (ii) between one housing component 13*b* and another housing component 13*b*, and the board components 29*a* and the board components 29*b* are non-contiguous (i) between the board component 29*a* and the board component 29*b* and (ii) between one board component 29*b* and another board component 29*b*.

Although FIG. 10 illustrates one housing component 13*a* and one housing component 13*b*, multiple housing components 13*a* and multiple housing components 13*b* are arranged along the X-axis direction, as illustrated in FIG. 9. Similarly, although FIG. 10 illustrates one board component 29*a* and one board component 29*b*, multiple board components 29*a* and multiple board components 29*b* are arranged along the X-axis direction, as illustrated in FIG. 9. In these rows, the clearance L and the clearance O are arranged with misalignment in the X-axis direction. That is to say, in these rows, the clearance L and the clearance O are arranged alternately toward the X-axis direction.

Furthermore, the housing components 13*a* and 13*b* and the board components 29*a* and 29*b* are arranged at positions based on positions of the lenses 11 and 12 or at positions based on positions of the imaging elements 23, and the housing components 13*a* and 13*b* and the board components 29*a* and 29*b* are bonded to each other. Specifically, each housing component 13*a* is bonded to a corresponding board component 29*a* and a board component 29*b*, and each housing component 13*b* is bonded to one board component 29*b* and another board component 29*b* adjacent to the one board component 29*b*. In other words, the housing components 13*a* and 13*b* and the board components 29*a* and 29*b* are bonded to each other while keeping positions of the imaging elements 23 to be aligned with focal positions of light transmitted through the lenses 11 and 12, thereby forming the housing 13 and the board 29.

In the image reading device 1, the clearance L is provided (i) between the housing component 13*a* and the housing component 13*b* and (ii) between the housing components 13*b*. As a result, positions of the housing components 13*a* and 13*b* change to track expansion and contraction of the board components 29*a* and 29*b* due to a change in temperature of the usage environment. Further, the clearance O is provided (i) between the board component 29*a* and the board component 29*b* and (ii) between the board components 29*b*. As a result, positions of the board components 29*a* and 29*b* change to track expansion and contraction of the housing components 13*a* and 13*b* due to a change in temperature of the usage environment. This configuration allows the image reading device 1 to eliminate or reduce misalignment in relative positions in the X-axis direction between the imaging elements 23 and the lenses 11 and 12 due to a difference between a linear expansion of the housing 13 and a linear expansion of the board 29. In order to provide the housing 13 and the board 29 such that either one of the housing 13 or the board 29 is continuous in the X-axis direction at each of all positions in the X-axis direction, the clearance L and the clearance O are arranged with misalignment.

As described above, the housing components 13*a* and 13*b* may be manufactured by any method that satisfies only positional accuracy of the held lenses 11 and 12. In this case, the housing components 13*a* and 13*b* enable more relaxed component processing accuracy that is needed for positional accuracy between the lenses 11 and 12 and the imaging elements 23 than in a case of manufacturing an image reading device using an integrated housing.

Furthermore, the board components 29*a* and 29*b* may be manufactured by any method that satisfies only positional accuracy of the held imaging elements 23. In this case, the board components 29*a* and 29*b* enable more relaxed component processing accuracy that is needed for accuracy in positional relationships between the lenses 11 and 12 and the imaging elements 23 than in a case of manufacturing an image reading device using an integrated board.

Assembly accuracy of one housing component included in the housing components 13*a* and 13*b* with respect to a corresponding board component included in the board components 29*a* and 29*b* does not affect assembly accuracy of another housing component included in the housing components 13*a* and 13*b* with respect to a corresponding board component included in the board components 29*a* and 29*b*. Thus, the housing components 13*a* and 13*b* enable more relaxed assembly accuracy that is needed for accuracy in positional relationships between the lenses 11 and 12 and the imaging elements 23 than in a case of manufacturing an image reading device using an integrated housing.

Moreover, assembly accuracy of one board component included in the board components 29*a* and 29*b* with respect to a corresponding housing component included in the housing components 13*a* and 13*b* does not affect assembly accuracy of another board component included in the board components 29*a* and 29*b* with respect to a corresponding housing component included in the housing components 13*a* and 13*b*. Thus, the board components 29*a* and 29*b* enable more relaxed assembly accuracy that is needed for accuracy in positional relationships between the lenses 11 and 12 and the imaging elements 23 than in a case of manufacturing an image reading device using an integrated board.

Similarly to Embodiment 1, desirable bonding positions N are each located in a region including a center of a surface of a corresponding one of the housing components 13*a* and 13*b* that faces the board 29. Bonding areas of the bonding are areas capable of securing bonding strength. Alternatively, similarly to Embodiment 2, bonding may be performed at bonding positions P that are illustrated in FIG. 8 and that each are located in a region including a center of a surface of a corresponding one of the board components 29*a* and 29*b* that faces the housing 13. Bonding areas of the bonding are also areas capable of sufficient bonding strength. This configuration averages misalignments of the lenses 11 and 12 with respect to the imaging elements 23 due to a change in temperature of a usage environment. Note that bonding is not performed at each of portions among the bonding positions N that overlaps the clearance O of the board 29. Also, note that bonding is not performed at each of portions among the bonding positions P that overlaps the clearance L of the board 29.

A desirable clearance L has a width that is larger than or equal to a difference in linear expansion that the housing components 13a and 13b are to have with respect to the board components 29a and 29b due to a change in temperature of the surrounding environment. Specifically, the desirable clearance L has a width that is larger than or equal to a maximum value of a difference in linear expansion that is the largest among those of the housing components with respect to the board components.

A desirable clearance O has a width that is larger than or equal to a difference in linear expansion of the aforementioned components. Specifically, the desirable clearance O has a width that is larger than or equal to a maximum value of a difference in linear expansion that is the largest among those of the aforementioned components.

That is to say, the desirable clearances L and O are each formed to have a width that prevents, even upon occurrence of a change in temperature due to a change in the environment from a manufacturing environment to a usage environment, contact between the housing components 13a and the housing components 13b, contact between the housing components 13b, contact between the board components 29a and the board components 29b, and contact between the board components 29b.

The maximum value of the difference in linear expansion that the housing components 13a and 13b have with respect to the board components 29a and 29b and the maximum value of the difference in linear expansion that the board components 29a and 29b have with respect to the housing components 13a and 13b may be obtained by, for example, measurement through prior experimentation, or may be calculated in a simulation.

A more desirable clearance L has a width that is larger than or equal to a value obtained by adding, to the difference in linear expansion that the housing components 13a and 13b have with respect to the board components 29a and 29b, (i) an error due to a variance in external dimensions of the housing components 13a and 13b, (ii) an error due to a variance in positions that occurs at the time of mounting the imaging elements 23 on the board 29, and (iii) an error due to a variance in positions that occurs in the housing components 13a and 13b and the board 29 at the time of assembling of the image reading device 1.

Furthermore, a more desirable clearance O has a width that is larger than or equal to a value obtained by adding, to the difference in linear expansion that the board components 29a and 29b have with respect to the housing components 13a and 13b, (i) an error due to a variance in external dimensions of the board components 29a and 29b, (ii) an error due to a variance in positions that occurs at the time of mounting the imaging elements 23 on the board 29, and (iii) an error due to a variance in positions of the board components 29a and 29b and the housing 13 that occurs at the time of assembling the image reading device 1.

Forming the clearances L and O as described above enables, in the image reading device 1, relaxing (i) accuracy in external dimensions of the housing components 13a and 13b (ii) accuracy in external dimensions of the board components 29a and 29b, (iii) positional accuracy at the time of mounting the imaging elements 23 on the board 29, and (iv) positional accuracy at the time of assembling the housing components 13a and 13b and the board components 29a and 29b. As a result, a decrease in a manufacturing cost, improvement in productivity, and the like, are achieved for the image reading device 1.

Although the present embodiment describes an example of dividing the housing 13 and the board 29 into multiple pieces along the X-axis direction, the configurations of the housing 13 and the board 29 are not limited to this example. In a case of arranging each of the lenses 11, the lenses 12, and the imaging elements 23 along the X-axis direction in multiple rows, the housing 13 and the board 29 may be divided into multiple pieces along the Y-axis direction in correspondence to the rows. In this case, preferable housing components 13a and 13b have shapes obtained by dividing the housing 13 into multiple pieces along the Y-axis direction in correspondence to the rows and are arranged to the clearance L therebetween, and preferable board components 29a and 29b have shapes obtained by dividing the board 29 into multiple pieces along the Y-axis direction in correspondence to the rows and are arranged to have the clearance O therebetween. This configuration enables eliminating or reducing a change in relative positions of the lenses 11 and 12 in the Y-axis direction with respect to the imaging elements 23. Thus, in a case of dividing the housing 13 and the board 29 into multiple pieces not only along the Y-axis direction but also along the X-axis direction, the housing 13 and the board 29 that are divided in the aforementioned manner enable eliminating or reducing a change in relative positions of the lenses 11 and 12 in the X-axis direction and in the Y-axis direction with respect to the imaging elements 23.

The numbers of the housing components 13b and the board components 29b to be arranged may be increased or decreased, similarly to Embodiments 1 and 2. This enables changing lengths of the housing 13 and the board 29 in the X-axis direction, and as a result, also enables common use of the housing components 13b and board component 29b of the image reading device 1 in other models that are shorter or longer in length. Thus, reduction in a manufacturing cost and expansion of model lineup, and the like, are achieved for the image reading device 1.

As described above, according to the image reading device 1 according to Embodiment 3, multiple housing components 13a and 13b that each hold the lenses 11 and the lenses 12 and are arranged along the main scanning direction are arranged to have the clearance L therebetween, and multiple board components 29a and 29b that each are mounted thereon the imaging elements 23 and are arranged along the main scanning direction are arranged to have the clearance O therebetween. Further, the housing components 13a and 13b and the board components 29a and 29b are fixed to each other at positions to transmit light through the lenses 11 and 12 to focus onto the corresponding imaging element 23. Thus, in the image reading device 1, the housing components 13a and 13b change positions thereof to track expansion and contraction of the board components 29a and 29b, and the board components 29a and 29b change positions thereof to track expansion and contraction of the housing components 13a and 13b. As a result, the image reading device 1 can eliminate or reduce a change in relative positions between the lenses 11 and 12 and the imaging elements 23 due to a difference in linear expansion, and thus can ensure positional accuracy.

Furthermore, the image reading device 1 enables relaxation of component processing accuracy and assembly accuracy that are needed for achievement of accuracy in positional relationships between the lenses 11 and 12 and the imaging elements 23.

Although Embodiments 1-3 are described above, the present disclosure is not limited to these embodiments. For example, although aforementioned Embodiments 1-3 describe arranging each of the lenses 11, the lenses 12, and the imaging elements 23 along the X-axis direction in a staggered manner in two rows, this configuration is not limiting. For example, each of the lenses 11, the lenses 12, and the imaging elements 23 may be arranged linearly, or may be arranged in one row or in three or more rows.

Although aforementioned Embodiments 1 and 3 describe the housing walls 19a and 19b as members that are continuous in the X-axis direction, the housing walls 19a and 19b may be divided along the X-axis direction similarly to the housing 13. Increasing or decreasing the number of components obtained by dividing the housing walls 19a and 19b enables changing the lengths of the housing walls 19a and 19b in the X-axis direction, thereby enabling common use of components of the image reading device 1 in other models that are shorter or longer in length. Further, each of the components obtained by dividing the housing walls 19a and 19b along the X-axis direction may be integrated with a housing component included in the housing components 13a and 13b that is located at a position corresponding to the component. This enables attainment of various effects, such as reduction in molding cost and die cost for the housing 13, and expansion of model lineup of the image reading device 1. Moreover, although the housing 13 is formed by two types of components, that is, by the housing components 13a and 13b, this configuration is not limiting. Any type of component may be used to form the housing 13 in consideration of productivity, common use of a component in other models, and the like.

Although lenses are used in aforementioned Embodiments 1-3 as optical components for focusing light from the reading target onto the imaging elements 23, the optical components are not limited thereto. Each of the optical components may be a mirror only, or may be an optical component that is a combination of a lens and a mirror. Further, although the lenses 11, the lenses 12, the light guides 18a and 18b, the housing 13, the housing walls 17a and 17b, the housing walls 19a and 19b, and the housing 28 are manufactured by injection molding of thermoplastic polycarbonates, materials and manufacturing methods of these elements are not limited thereto, and other materials and manufacturing methods may be employed. Additionally, although the cover 14 is manufactured by press working of an aluminum sheet metal, this is not limiting, and other materials and manufacturing methods may be employed for the cover 14. Moreover, although a laminated plate obtained by laminating copper foil onto a glass epoxy board is used as the boards 16a and 16b, the board 24, and the board 29, this is not limiting, and other materials may be used.

Although the housing 13 and the board 24 are bonded and fixed to each other in aforementioned Embodiment 1, the housing 28 and the board 29 are bonded and fixed to each other in aforementioned Embodiment 2, and the housing 13 and the board 29 are bonded and fixed to each other in aforementioned Embodiment 3, this is not limiting, and other fixing means may be used.

Although the board 29 is formed of two types of components, that is, the board components 29a and the board components 29b in aforementioned Embodiment 2, this configuration is not limiting. A type of component that forms the board 29 may be determined in consideration of productivity, common use of a component in other models, and the like. Further, although the housing 28 is formed integrally with the housing walls 19a and 19b of Embodiment 1, this configuration is not limiting, and the housing walls 19a and 19b may be formed separately from the housing 28. In a case in which elimination or reduction of leakage of light and entrance of light via the clearance O is required, sealing may be provided using a member having flexibility, such as a resin film.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

1 Image reading device
11, 12 Lens
13, 28 Housing
13a, 13b Housing component
14 Cover
15 Light source
16a, 16b Board
17a, 17b, 19a, 19b Housing wall
18a, 18b Light guide
20a, 20b Bracket
21a, 21b Heat dissipation sheet
22a, 22b Cushion
23 Imaging element
24, 29 Board
25 Reading target
26 Hole
27 Claw
29a, 29b Board component
30a, 30b Surface
A Aperture
BL Broken line
L, M, O Clearance
N, P Bonding position

The invention claimed is:
1. An image reading device comprising:
a board including a plurality of imaging elements arranged along a scanning direction and a plurality of board components arranged along the scanning direction, each of the plurality of board components being mounted with at least one imaging element included in the plurality of imaging elements; and
a housing including a plurality of optical components arranged along the scanning direction and a plurality of housing components arranged along the scanning direction, each of the plurality of optical components being configured to focus light reflected by a reading target onto a corresponding imaging element included in the plurality of imaging elements, each of the plurality of housing components holding at least one optical component included in the plurality of optical components, wherein the plurality of housing components are arranged to have a first clearance therebetween, the plurality of board components are arranged to have a second clearance therebetween, each of the plurality of housing components and a corresponding board component included in the plurality of board components are fixed to each other at a position to transmit light through the optical component to focus onto the corresponding imaging element, and the first clearance and the second clearance are arranged to be staggered in the scanning direction.

2. The image reading device according to claim 1, wherein the plurality of board components are arranged along both a main scanning direction and a sub-scanning direction or arranged along one of the main scanning direction or the sub-scanning direction.

3. The image reading device according to claim 1, wherein the second clearance has a width in the scanning direction that is larger than or equal to a difference between a linear expansion of the housing and a linear expansion of each of the plurality of board components in the scanning direction.

4. The image reading device according to claim 1, wherein each of the plurality of board components has a surface facing the housing and is fixed to the housing at a region including a center of the surface.

5. The image reading device according to claim 1, further comprising:

a board including a plurality of imaging elements arranged along a scanning direction;

a cover that covers (i) surfaces of the plurality of housing components that faces the reading target, (ii) surfaces of the plurality of optical components that faces the reading target, and (iii) side surfaces of the plurality of housing components, and has holes in portions that cover the side surfaces, wherein the plurality of housing components include housing components that have claws, the claws being arranged on the side surfaces of the housing components and being fitted to the holes in the cover, and a third clearance is provided between each of the holes and the corresponding claw in the scanning direction.

6. The image reading device according to claim 1, wherein each of the plurality of housing components has a surface facing the board and is fixed to the board at a region including a center of the surface.

* * * * *